(12) United States Patent
Nagata et al.

(10) Patent No.: US 6,681,878 B2
(45) Date of Patent: Jan. 27, 2004

(54) AXLE ASSEMBLY

(75) Inventors: Kentaro Nagata, Amagasaki (JP); Norihiro Ishii, Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 109 days.

(21) Appl. No.: 10/117,064

(22) Filed: Apr. 8, 2002

(65) Prior Publication Data

US 2002/0155917 A1 Oct. 24, 2002

(30) Foreign Application Priority Data

Apr. 20, 2001 (JP) ........................ 2001-122926

(51) Int. Cl.[7] ................................. F01M 9/06
(52) U.S. Cl. .................. 180/233; 74/606 R; 475/230
(58) Field of Search ................ 180/233, 245; 475/230, 220; 74/606 R

(56) References Cited

U.S. PATENT DOCUMENTS

| | | | | |
|---|---|---|---|---|
| 2,478,180 A | * | 8/1949 | Buckendale | 74/607 |
| 5,316,106 A | * | 5/1994 | Baedke et al. | 184/6.12 |
| 6,189,410 B1 | * | 2/2001 | Inoue | 74/606 R |
| 6,450,914 B1 | * | 9/2002 | Irwin et al. | 475/230 |
| 6,523,435 B2 | * | 2/2003 | Ruehle et al. | 74/606 R |

FOREIGN PATENT DOCUMENTS

JP 57-128524 A 8/1982

* cited by examiner

Primary Examiner—Lesley D. Morris
Assistant Examiner—Tony Winner
(74) Attorney, Agent, or Firm—Sterne, Kessler, Goldstein & Fox P.L.L.C.

(57) ABSTRACT

In an axle assembly, a differential gear device includes a ring gear and a differential cage. The ring gear has a gear portion formed on a first side surface thereof, which first side surface faces the input shaft and is positioned along the axis of the driving axles, for being operatively connected with the input shaft, and forms an axle hole through which an inner end of one of the right and left driving axles relatively rotatably passes. The differential cage is relatively non-rotatably connected with the ring gear via a second side surface of the ring gear, which second side surface faces away from the input shaft and is positioned along the axis of the driving axles. The differential case also forms therein an axle hole through which an inner end of the residual one of the right and left driving axles relatively rotatably passes, so that the inner ends of the right and left driving axles face to each other.

20 Claims, 11 Drawing Sheets

AXLE ASSEMBLY

BACKGROUND OF THE INVENTION

1. Field of the Invention

The present invention is related to an axle assembly for branching the driving power transmitted from an engine to right and left driving axles.

2. Related Art

Hitherto, various types of axle assemblies for branching the driving power of the engine to a pair of right and left driving axles have been proposed. Among those assemblies, Japanese Utility Model Application Laid-open No. Sho-57-128524 discloses an axle assembly of the type that includes an axle case with an opening formed therein through which a differential gear device is inserted, and a lid for covering the opening, which lid acting as a support for supporting thereon the differential gear device and an input shaft for transmitting the driving power of the engine to the differential gear device.

The differential gear device in the above axle assembly includes a differential cage for accommodating a pair of side gears and a bevel gear meshed with the pair of side gears, and a ring gear relatively non-rotatably connected with the differential cage, in which the differential cage is supported on the lid.

The axle assembly having the above arrangement enables the differential gear device to be accommodated within the axle case while being supported by the lid, thereby contributing to efficient assembly.

However, since the aforesaid conventional axle assembly is designed to have the differential cage encompassed by the ring gear, it necessitates the axle assembly to have a maximum diameter larger than the differential case. That is, this conventional axle assembly has a maximum diameter necessarily defined by the ring gear designed to encompass the differential cage, so that the axle case for accommodating the axle assembly must have an enlarged inner diameter.

The diametrical enlargement of the axle case goes against an ultimate goal of reduction in size of a vehicle, as well as invites not only increased manufacturing cost but also shortened distance between the axle case and a road surface under the running vehicle. Also, such shortened distance sometimes poses a problem of causing accidental contacts between the axle case and stones or any other matters on the road surface.

To address the above problems, it is an object of the present invention to provide an axle assembly that is capable of achieving improved assembling efficiency and reducing the size of the axle case as small as possible.

SUMMARY OF THE INVENTION

According to the present invention, there is provided an axle assembly that includes an axle case for accommodating right and left driving axles, the axle case forming therein an opening, a differential gear device accommodated within the axle case through the opening of the axle case, a lid connected with the axle case so as to cover the opening, and an input shaft for operatively inputting the driving force from an engine. The differential gear device includes a ring gear and a differential cage. The ring gear has a gear portion formed on a first side surface thereof, which side surface faces the input shaft and is positioned along the axis of the driving axles, for being operatively connected with the input shaft, and forms an axle hole through which an inner end of one of the right and left driving axles relatively rotatably passes. The differential cage is relatively non-rotatably connected with the ring gear via a second side surface of the ring gear, which side surface faces away from the input shaft and positioned along the axis of the driving axles, and forms therein an axle hole through which an inner end of the residual one of the right and left driving axles relatively rotatably passes, so that the inner ends of the right and left driving axles face to each other. The lid includes a first support member for supporting the input shaft and a second support member for supporting the differential gear device. The first and second support members are displaced along the lengthwise direction of the right and left driving axles.

According to the axle assembly having the above arrangement, it is possible to assemble the differential gear device and mount the same to the axle case with improved efficiency, as well as reduce the maximum outer diameter of the differential gear device, thereby achieving downsizing of the axle case.

The second support member may include a first support wall for relatively rotatably supporting the ring gear, and a second support wall spaced apart from the first side wall along the lengthwise direction of the driving axles for relatively rotatably supporting the differential cage. In this arrangement, the second support member is preferably positioned more inwardly than the first support member with respect to a vehicle width direction.

The axle assembly of the present invention may be designed to transmit the driving force to steering driving wheels. According to this arrangement, the axle case has opposite outer ends respectively connected with a pair of steering wheels, which are interlocked with each other through a tie-rod for associated pivoting action. The cover case has an outer surface corresponding to the second support member and provided on the outer surface with an extension member that extends inwardly with respect to a vehicle lengthwise direction. The extension member has a portion with which a fixing end of a power steering cylinder for pivoting one of the pair of steering wheels by pressure is rotatably connected.

According to one embodiment, the differential gear device further includes a pair of side gears accommodated within the differential cage, while being respectively and relatively non-rotatably supported by the inner ends of the right and left driving axles, and a pinion gear accommodated within the differential cage in such a manner as to rotate in meshing engagement with the pair of side gears and move around a rotational axis of the differential cage in association with the rotation of the differential cage.

In the above embodiment, the differential cage may include a flange portion that abuts against the second side surface of the ring gear and forms therein an opening through which the pair of side gears can pass, a body portion extending from the flange portion in a direction away from the ring gear and providing an inner space for accommodating therein the pair of side gears and the pinion gear, and a bearing portion that extends from the body portion in a direction away from the ring gear and forms therein an axle hole through which an inner end of the residual one of the right and left driving axles relatively rotatably passes. The flange portion forms therein at least one hole for receiving at least one fastener for interlocking the differential cage with the ring gear. The body portion forms therein at least one cut-away portion allowing for insertion of the at least one fastener into the at least one hole along the axis thereof.

According to another embodiment, the ring gear has a protrusion axially protruding from the second side surface of the ring gear, and the differential cage forms on a side surface thereof facing the ring gear an engaging hole for receiving the protrusion. The protrusion is engagingly inserted into the engaging hole so that the ring gear and the differential cage are interlocked with each other in such a manner as to be relatively non-rotatable around the axis.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Figure 1:
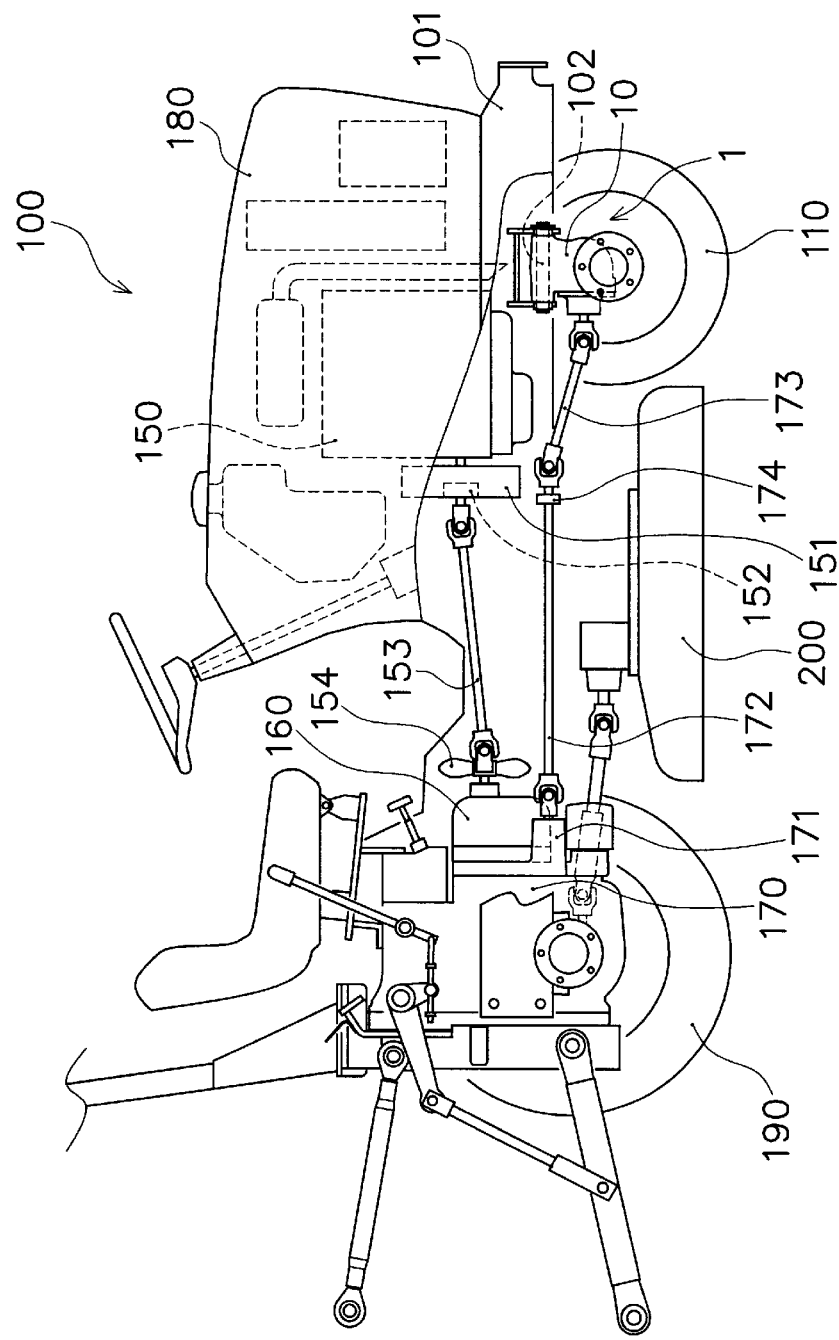
FIG. 1 is a schematic side view of a vehicle with an axle assembly of one embodiment of the present invention.
Figure 2:
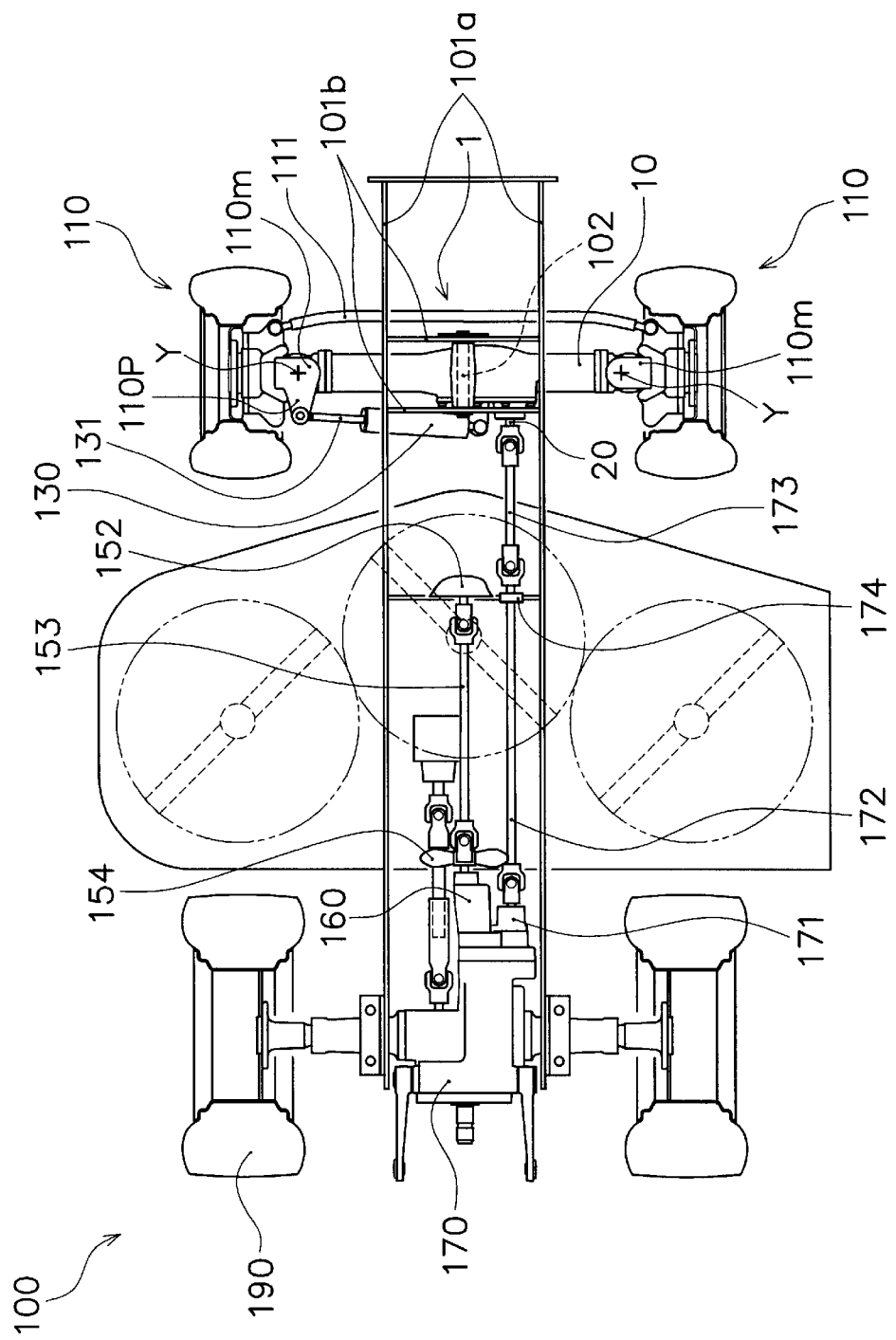
FIG. 2 is a plan view with a partially omitted portion of the vehicle in FIG.
Figure 3:
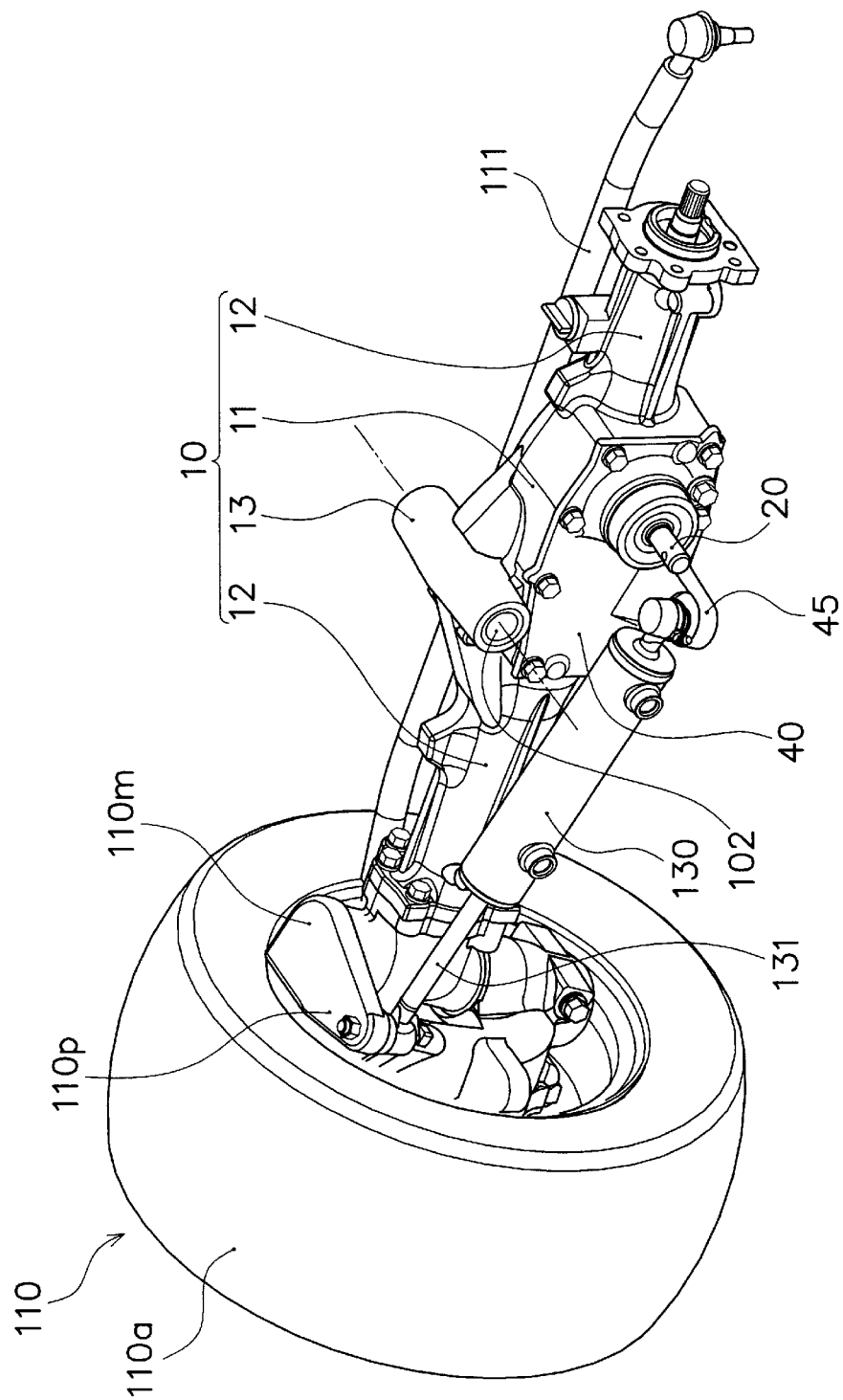
FIG. 3 is a perspective view of the axle assembly applied to the vehicle of FIGS. 1 and 2, as viewed from the rear side.

The embodiments of the axle assembly according to the present invention will be hereinafter described with reference to the drawings attached hereto. FIG. 1 is a schematic side view of vehicle 100 with axle assembly 1 of this embodiment. FIG. 2 is a plan view with a partially omitted portion of the vehicle 100. FIG. 3 is a perspective view of the axle assembly 1 of this embodiment as viewed from the rear side.

The axle assembly of this embodiment will be described by taking for example the case where the axle assembly has an arrangement enabling differential transmission of the driving power from engine 150 to a pair of front wheels 110 which are steering and driving wheels.

Figure 4:
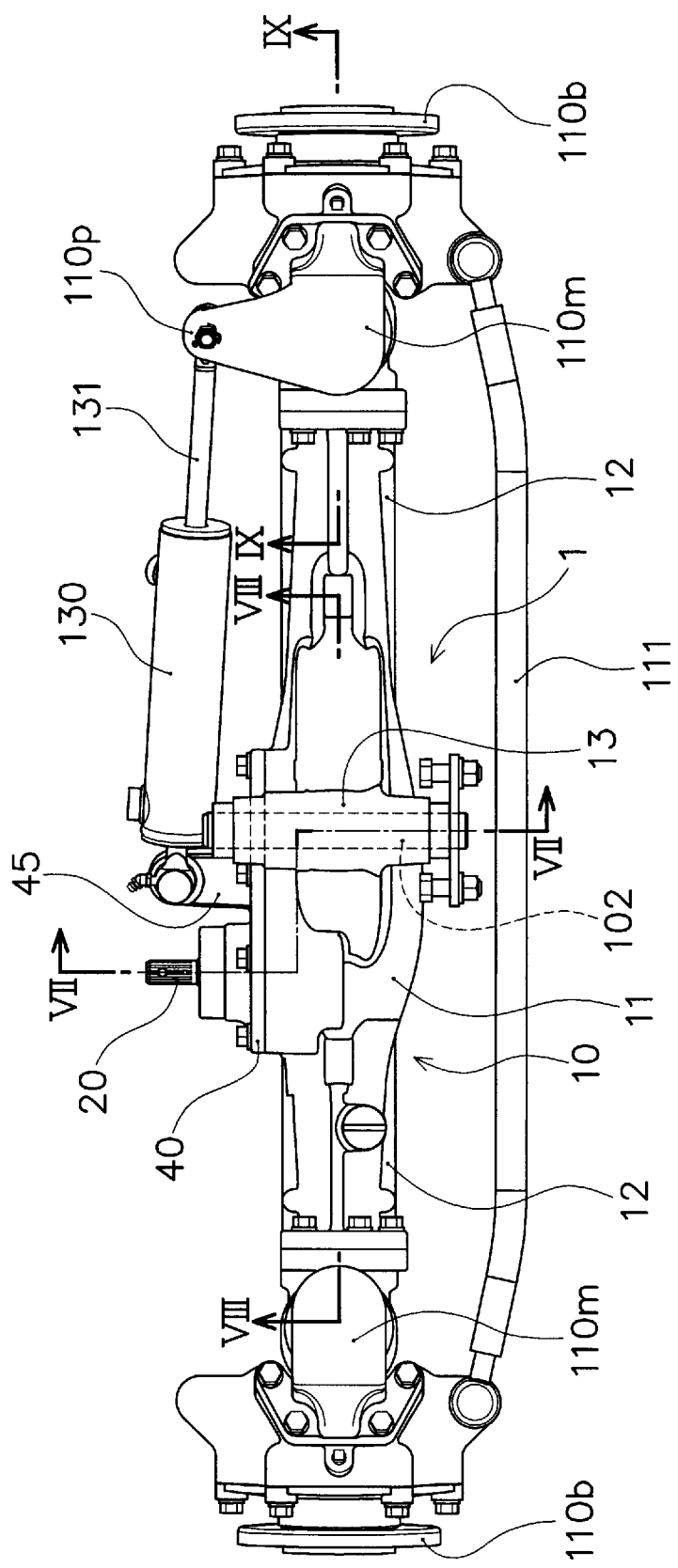
FIG. 4 is a plan view of a portion of the vehicle of FIGS. 1 and 2 near the axle assembly.
Figure 5:
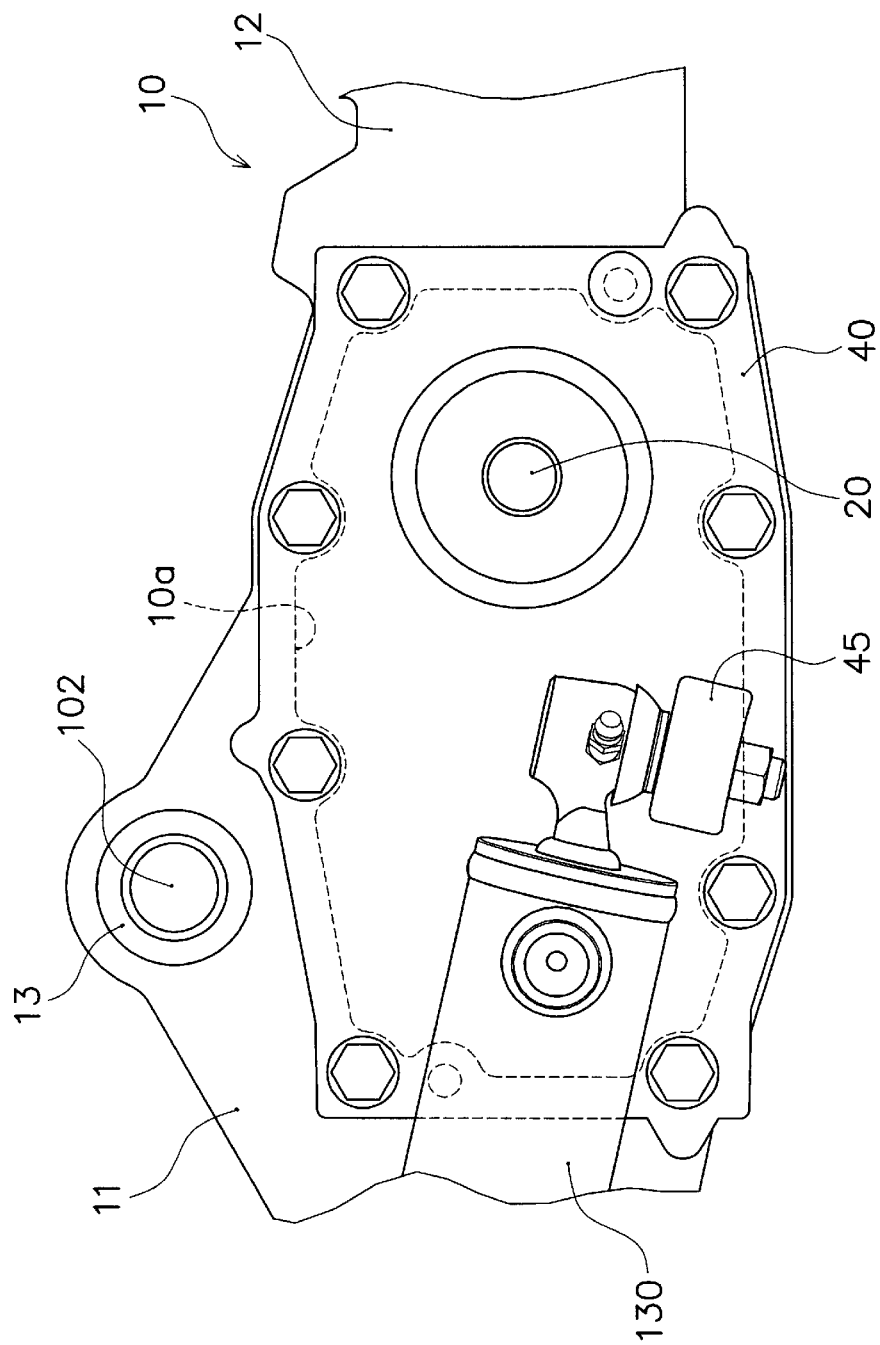
FIG. 5 is a rear view of the portion of the vehicle of FIG. 4.
Figure 6:
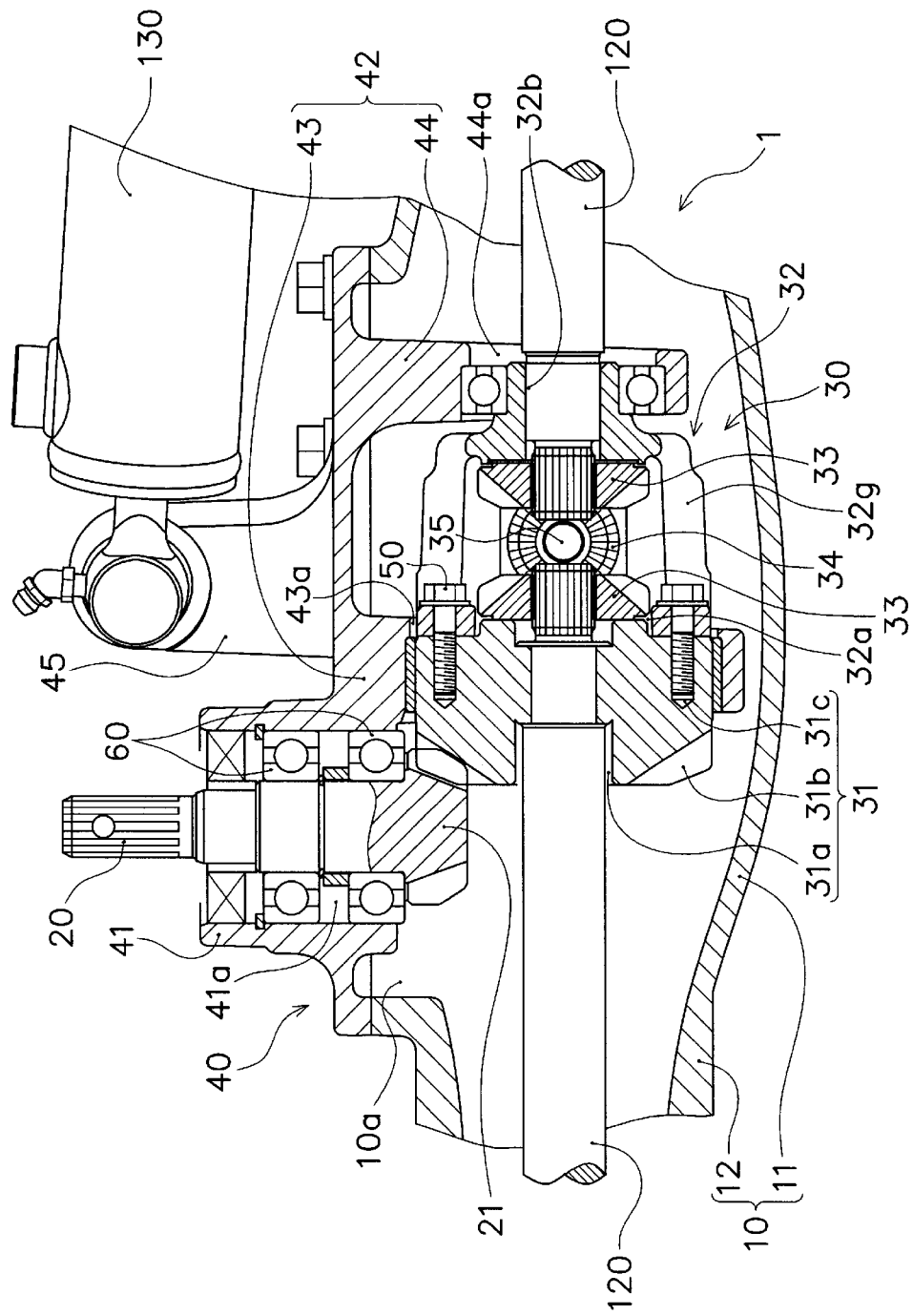
FIG. 6 is a cross-sectional plan view of the axle assembly illustrated in FIGS. 3–5.

The front and rear views of the axle assembly 1 are respectively illustrated in FIGS. 4 and 5. The partially cross sectioned plan view of the axle assembly 1 is illustrated in FIG. 6. The cross sections taken along the lines VII—VII, VIII—VIII and IX—IX in FIG. 4 are respectively illustrated in FIGS. 7–9.

Figure 7:
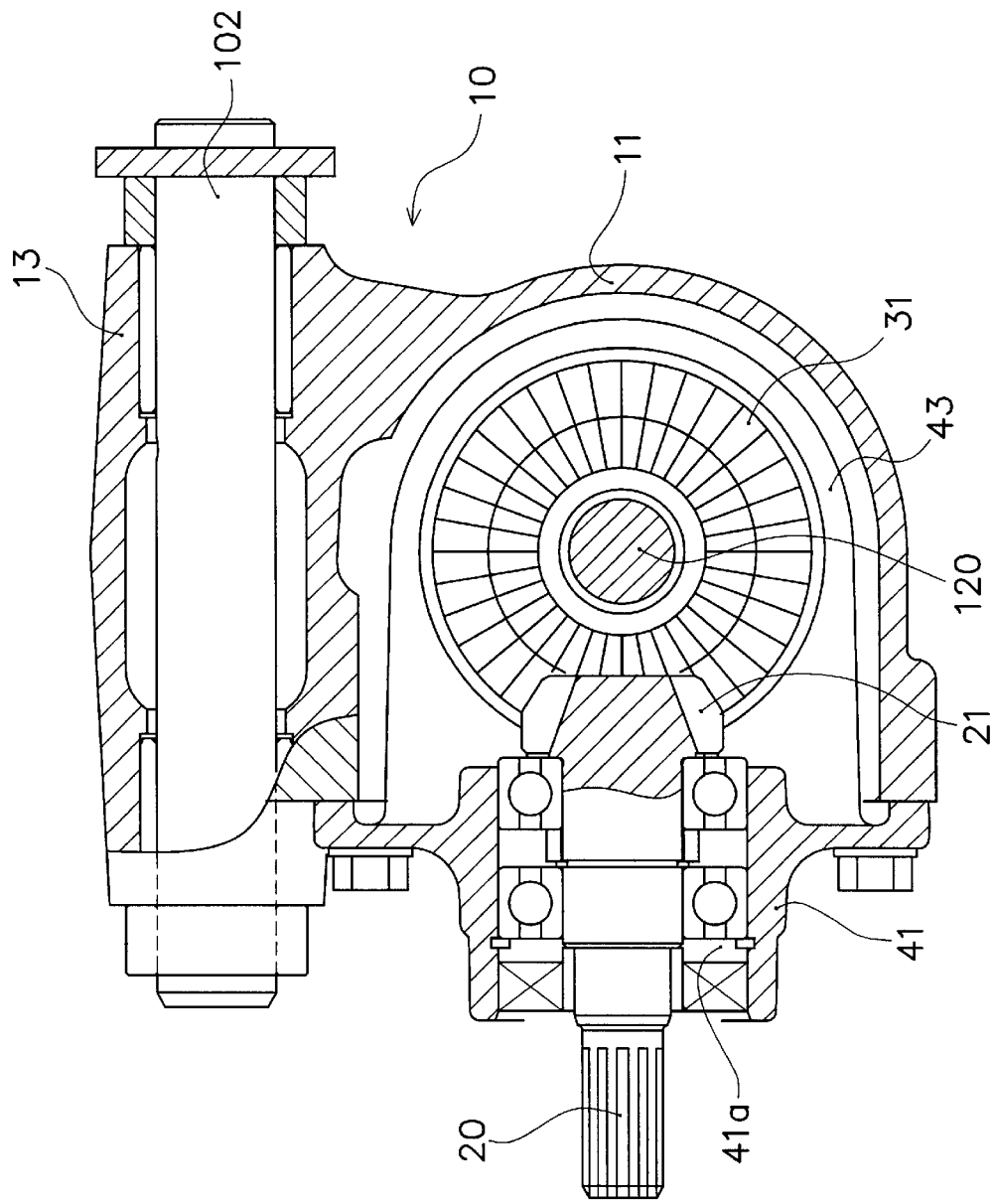
FIG. 7 is a cross section taken along the line VII—VII in FIG. 4.
Figure 8:
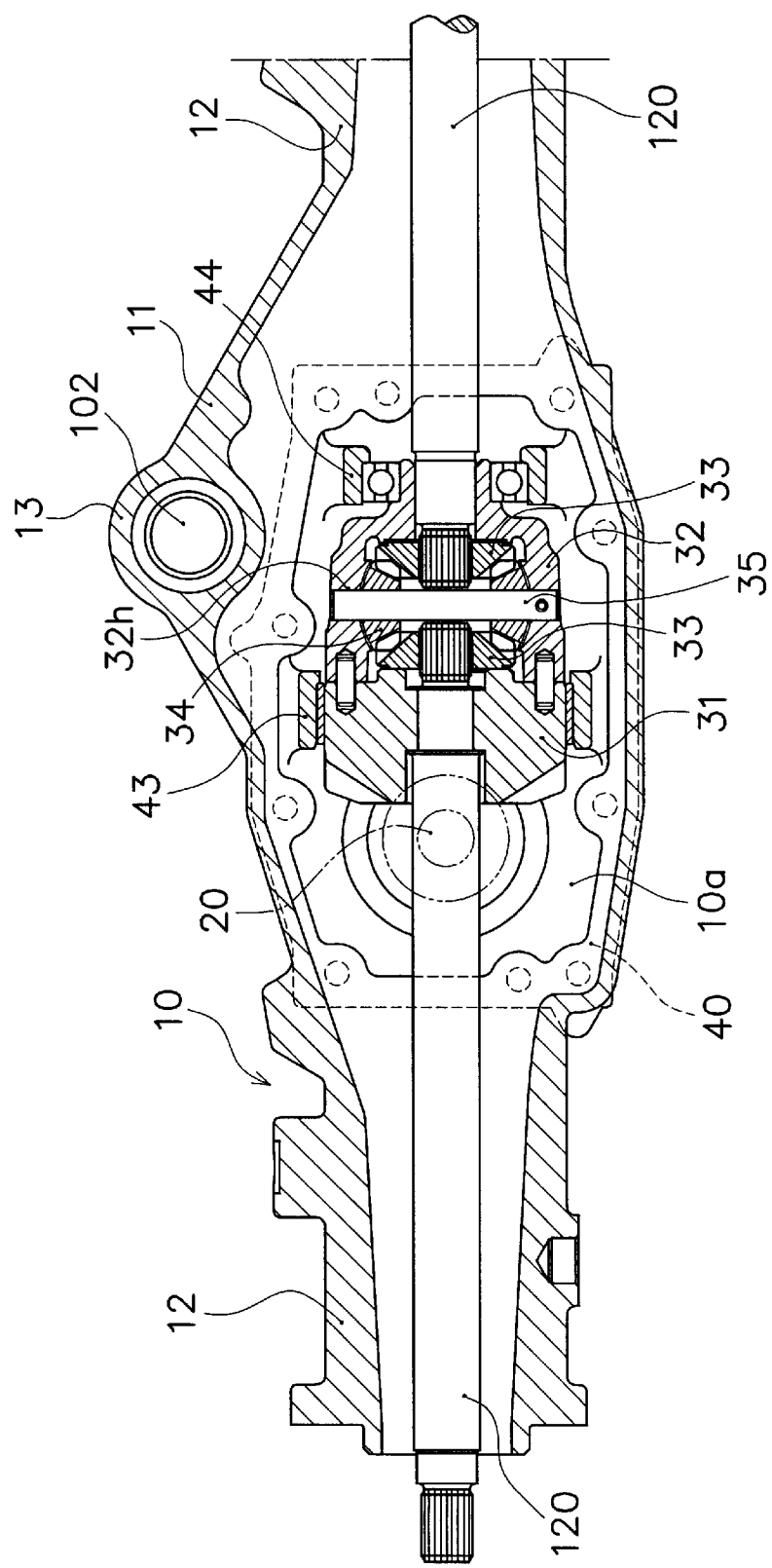
FIG. 8 is a cross section taken along the line VIII—VIII in FIG. 4.

As best shown in FIGS. 6–8, the axle assembly 1 includes axle case 10 for accommodating the right and left driving axles, input shaft 20 for operatively receiving the driving power from the engine 150, differential gear device 30 accommodated in the axle case 10 through opening 10a formed in the axle case 10, and lid 40 connected with the axle case 10 to close the opening 10a.

The axle case 10 is supported on frame 101 of the vehicle 100 in such a manner as to pivot around center pin 102 supported along the vehicle lengthwise direction, as illustrated in FIGS. 1–5.

Specifically, the frame 101 includes a pair of main frames 101a disposed substantially parallel to each other along the vehicle lengthwise direction, and a pair of forwardly and rearwardly positioned cross members 101b for connection between the pair of main frames 101a. The center pin 102 is supported by the cross members 101b along the vehicle lengthwise direction.

More specifically, the axle case 10 includes a center portion 11 positioned substantially at the center with respect to the vehicle width direction, a pair of cylindrical portions 12 extending from the center portion 11 towards the opposite sides with respect to the vehicle width direction, and a bearing portion 13 positioned above the center portion for insertion of the center pin 102.

The center portion 11 is sized to accommodate the differential gear device 30 and has a rear wall forming therein opening 10a sized to allow the differential gear device 30 to pass therethrough.

The pair of cylindrical portions 12 respectively form center holes for receiving right and left front axles 120, and have outer ends respectively connected with hereinafter-described fixed gear case 110j of the right and left driving wheels.

Figure 9:
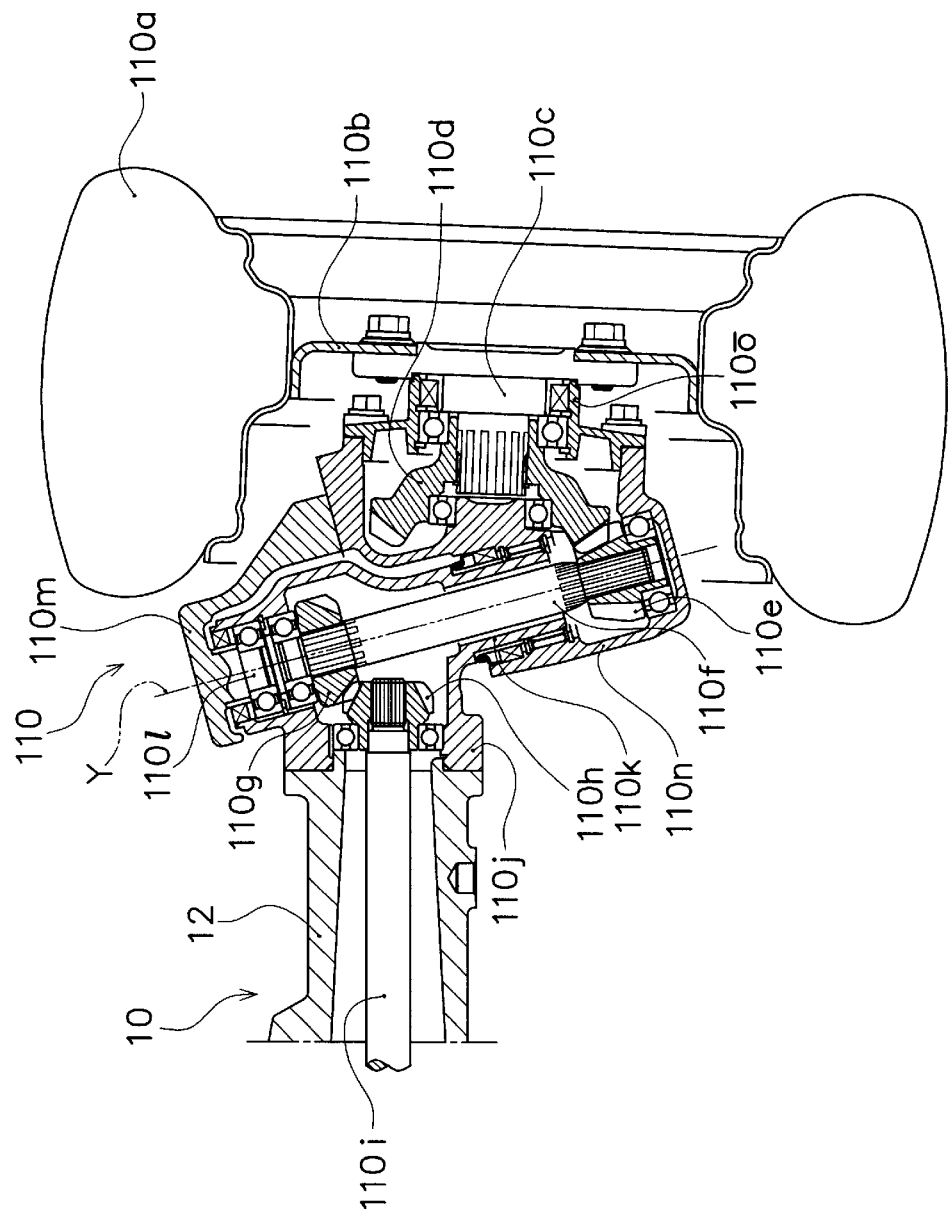
FIG. 9 is a cross section taken along the line IX—IX in FIG. 4.

More specifically, as illustrated in FIG. 9, the right and left driving wheels 110 each include rim 110b supporting a tire 110a, wheel shaft 110c relatively non-rotatably connected with the rim 110b, bevel gear 110d relatively non-rotatably supported on the wheel shaft 110c, lower pinion 110e meshed with the bevel gear 110d, pinion shaft 110f relatively non-rotatably supporting the lower pinion 110e at its lower end, upper pinion 110g relatively non-rotatably supported on an upper end of the pinion shaft 110f, yoke-shaft-pinion 110h meshed with the upper pinion 110g, differential yoke shaft 110i relatively non-rotatably supporting the yoke-shaft-pinion 110h and interlocked with a corresponding front axle 110 in such a manner as to be relatively non-rotatable thereto, fixed gear case 110j connected with an outer end of the axle case 10 and relatively rotatably supporting an upper end of the pinion shaft 110f, lower king pin 10k downwardly extending from the fixed gear case 110j and disposed around the pinion shaft 110f, upper king pin 110l relatively rotatably supported on the fixed gear case 110j in such a manner as to be positioned above the pinion shaft 110f and coaxial with the same, connection arm 110m connected with the upper king pin 110l and pivotable around the axis of the king pin 110l, movable gear case 110n relatively rotatably supporting the lower king pin 110k and the lower pinion 110e and pivotable around axis Y of the upper king pin 110l in association with the connection arm 110m, and shaft cover 110o relatively rotatably mounted on an external wall of the wheel shaft 110c and connected with the movable gear case 110n.

One of the right and left driving wheels 110 (left driving wheel in this embodiment, as illustrated in FIG. 2) is provided with knuckle arm 110p that extends from the connection arm 110m in a direction substantially orthogonal to the axis Y of the upper king pin.

Movable gear cases 110n in both driving wheels are interlocked to each other through a tie-rod 111 for associated pivoting action so that one movable gear case 110n is moved by the movement of another movable gear case 110n.

In this embodiment, movable piston 131, which is reciprocable with respect to power steering cylinder 130 by the action of hydraulic pressure has a free end to which the knuckle arm 110p is connected, as illustrated in FIGS. 2 and 4.

Accordingly, upon the movement of the movable piston 131, the knuckle arm 110p, the connection arm 110m, the movable gear case 110n and the shaft cover 110o of one driving wheel 110 (left driving wheel in this embodiment) are pivoted around the axis Y of a corresponding upper king pin 110l. Whereby, the left driving wheel 110a is pivoted around the axis Y of the upper king pin 110l.

As described above, the right and left driving wheels 110 are interlocked to each other through the tie-rod 111, so that once the left tire 110a is pivoted, the right tire 110a is pivoted around a corresponding upper king pin by the same amount in the same direction. Thus, the right and left front driving wheels 110 are steered.

The input shaft 20 is to operatively receive the driving power from the engine 150, as described above.

As illustrated in FIG. 1, the vehicle 100 of this embodiment has the engine 150, HST (hydrostatic transmission) 160 and transmission 170 which are disposed in sequence on the frame 101 along the vehicle lengthwise direction. The driving power outputted from the engine 150 is transmitted to an input shaft of the HST 160 via elastic joint 152 mounted on the rotational center of a flywheel and main power-transmission shaft 153 that has at its both ends adjustable joints and is downwardly oriented towards the rear side of the vehicle. The driving power whose speed has been changed to a predetermined speed by the HST 160 and the transmission 170 is synchronously transmitted via a power take-off shaft for rear wheels (not shown) and power take-off shaft 171 for front wheels (hereinafter referred to a front wheel PTO shaft) respectively to a rear axle assembly (not shown) for driving rear wheels 190 and the front axle assembly 1 for driving the front wheels 110.

As illustrated in FIGS. 1 and 2, the front wheel PTO shaft 171 is connected with a rear end of first power-transmission shaft 172 disposed in a substantially horizontal orientation via an adjustable joint. A front end of the first power-transmission 172 is connected via an adjustable joint with second power-transmission shaft 173, which is downwardly oriented towards the front side of the vehicle. A front end of the second power-transmission shaft 173 is connected with the input shaft 20 via an adjustable joint. Reference numeral 174 in FIGS. 1 and 2 represents a bearing support for supporting the first power-transmission shaft 172 rotatably around the axis.

Reference numeral 154 in FIGS. 1 and 2 represents a cooling fan that is mounted on an adjustable joint of the downstream end of the main power transmission shaft 153 along the power transmission path. The cooling fan 154 is to blow air onto the HST 160, the transmission 170 and the like to indirectly cool hydraulic fluid stored in these members and circulated to respective portions. Installed on the front portion of the frame 101 are the engine 150 and its associated members such as a radiator and a fuel tank which are covered by bonnet 180.

As illustrated in FIGS. 6–8, the differential gear device 30 includes ring gear 31 operatively connected with the input shaft 20, differential cage 32 detachably and relatively non-rotatably connected with the ring gear 31, a pair of side gears 33 accommodated within the differential cage 32 while being relatively non-rotatably supported by inner ends of the right and left front axles 120, pinion gear 34 accommodated within the differential cage 32 in such a manner as to rotate in meshing engagement with the pair of side gears 33 and move around a rotational axis of the differential cage 32 in association with the rotation of the differential cage 32.

More specifically, the ring gear 31 is of a cylindrical shape that has a first side surface facing the input shaft 20 and a second side surface facing away from the input shaft, both side surfaces being opposite to each other along the axis of the right and left front axles 120, and axle hole 31a between the first and second sides, through which one of the right and left front axles 120 (right front axle in this embodiment) passes in such a manner as to be rotatable around its axis. The ring gear 31 is also provided with bevel gear 31b formed on the first side surface in meshing engagement with bevel gear 21 that is disposed on a front end of the input shaft 20, and threaded holes 31c formed on the second side (rear side).

The differential cage 32 has a hollowed body with opening 32a on a first side surface directing outwardly along the axis of the driving axles 120, through which the pair of side gears 33 can pass, and axle hole 32b on a second side surface opposite to the first side surface and facing away from the ring gear 31 along the axis of the driving axles 120, through which the residual one of the right and left front axles 110 (left front axle in this embodiment) passes in such a manner as to be rotatable around its axis.

As described above, in this embodiment, a meshing portion (bevel gear 31b) of the ring gear 31 with which the input shaft 20 is meshed is disposed on the first side surface of the ring gear 31, and the differential cage 32 is connected with the second side surface of the ring gear 31, so that the maximum diameter of the differential gear device 30 (maximum distance from the front axles 120 to a radially outermost part or element of the differential gear device 30) can be equalized to the maximum diameter of the differential cage 32, thereby achieving reduction in maximum diameter of the axle case 10.

That is, a conventional axle assembly with the ring gear disposed encompassing the differential cage necessarily causes the differential gear device to have a maximum diameter larger than the maximum diameter of the differential cage. This results in an enlarged maximum diameter of the axle case.

Contrary to the above, the arrangement of this embodiment with the bevel gear 31b provided on the first side surface of the ring gear 31 and the differential cage 32 connected with the second side surface of the ring gear 31 (i.e., the rear side surface of the ring gear 31 with respect to the input shaft 20) enables the differential gear device 30 to have a maximum diameter equal to the maximum diameter of the differential cage 32. In other words, in this embodiment, the maximum diameter of the differential gear device 30 can be reduced to the maximum diameter of the differential cage 32, thereby achieving reduction in maximum diameter of the axle case 10.

The reduction of the maximum diameter of the axle case 10 enables increase in the minimum ground clearance between the lower surface of the axle case 10 and the road surface. Accordingly, it is possible to effectively limit the possibility that the axle case 10 accidentally contacts an external matter such as stone on the road surface, without the necessity to increase the ground clearance.

Figure 10:
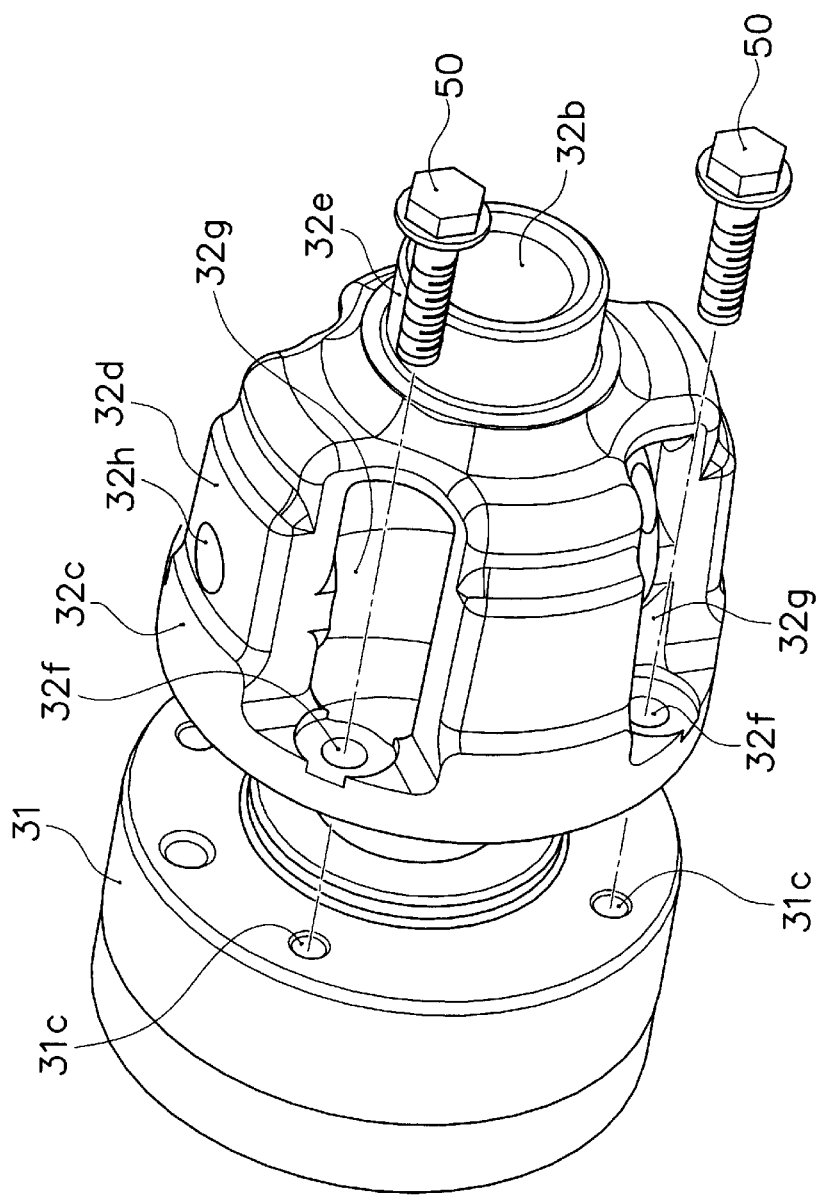
FIG. 10 is an exploded perspective view of a ring gear and a differential cage in the axle assembly.

An exploded perspective view of the ring gear 31 and the differential cage 32 is illustrated in FIG. 10. As illustrated in this Figure, the differential cage 32 in this embodiment is a ring shaped flange portion 32c adapted to contact the second side surface of the ring gear 31, and form therein the opening 32a and have an outer diameter substantially equal to the ring gear 31, hollowed body portion 32d that extends from the flange portion 32c in a direction away from the ring gear 31 along the axis of the driving axles 120 and has substantially the same outer diameter as the flange portion 32c, and bearing portion 32e that extends from the body portion 32d in a direction away from the ring gear 31 and forms therein the axle hole 32b.

The flange portion 32c forms therein bolt insertion holes 32f that respectively correspond to the threaded holes 31c formed on the second side surface of the ring gear 31.

The body portion 32d forms therein cut-away portions 32g allowing for insertions of fastening bolts 50 respectively into the bolt insertion holes 32f along the axes.

The cut-away portions 32g thus formed in the body portion 32 can not only improve an operational efficiency in fastening the differential cage 32 and the ring gear 31 together, but also achieve reduced weight and lower cost of the axle assembly thanks to the reduction in material costs of the differential cage 32.

In this embodiment, the pair of side gears 33 are interlocked with the right and left front axles 120 by a spline coupling so that they are relatively non-rotatably supported by these axles.

As illustrated in FIGS. 6 and 8, the pinion gear 34 is so arranged as to be able to mesh with the pair of side gears 33 while being relatively rotatably supported by rotatably supporting pin 35 that is inserted into bearing hole 32h formed in the differential cage 32. Whereby, the pinion gear 34 is moved around the axis of the differential cage 32 in response to the rotation of the same and rotated around the rotatably supporting pin 35 in response to the rotations of the pair of side gears 33.

As illustrated in FIGS. 6–8, the lid 40 includes first support portion 41 for rotatably supporting the input shaft 20 around the axis thereof and second support portion 42 for supporting the differential gear device 30.

Since the first support portion 41 forms therein opening 41a having such a size as to enable the input shaft 20 with the bevel gear 21 provided thereon to pass therethrough, the input shaft 20, which has passed through the opening, can be rotatably supported within the opening 41a via bearing 60 with the bevel gear 21 in meshed engagement with the ring gear 31.

The second support portion 42 is so arranged as to be able to support the differential gear device 30 at a position displaced from the first support portion 41 in the axial direction of the front axles 120.

More specifically, the second support portion 42 includes first support wall 43 forming therein support hole 43a for rotatably supporting the ring gear 31 and second support wall 44 forming therein support hole 44a for rotatably supporting the differential cage 32.

The lid 40 is preferably arranged so that the second support portion 42 is positioned at a substantially central portion of the vehicle between the lateral sides of the vehicle or with respect to the vehicle width direction, while the first support portion 41 is positioned outwardly than the second support portion 42 with respect to the vehicle width direction. With this arrangement, it is possible to efficiently secure a mounting space around the substantially central portion of the vehicle for mid-mount mower 200 or any other working device without interference to a front axle power transmission path comprised of the input shaft 20, the first power-transmission shaft 172, the second power-transmission shaft 173, etc.

That is, such lateral displacement of the first support portion 41 from the substantially central portion towards either lateral side of the vehicle allows the front axle power transmission path, which transmits the driving power through the transmission 170, the first power-transmission shaft 172 and the second power-transmission shaft 173 to the input shaft 20, to be positioned on the either lateral side of the vehicle without causing troubles. Whereby, the space for working device can be secured along substantially the center of the vehicle with respect to the vehicle width direction under the frame 101 and between the axle case 10, and the HST 160 and the transmission 170.

More preferably, on an outer surface of the lid 40 corresponding to the second support portion 42 is provided extension member 45 that extends inwardly with respect to the vehicle lengthwise direction or towards the space for the working device, thereby allowing the power steering cylinder 130 to be rotatably connected at its fixing end with the extension member 45.

With the above arrangement, the power steering cylinder 130 can be supported with leaving the space between the power steering cylinder 130 and the knuckle arm 10m as wide as possible without the necessity of such a complicated structure as to avoid the interference between the power steering cylinder 130 and the input shaft 20 by, for example, displacing them from each other in the vertical direction.

Now, the description will be made for an assembling process of the axle assembly 1 having the above arrangement.

First, one of the pair of side gears 33 (left side gear in this embodiment) is accommodated in the differential cage 32 through the opening 32a formed in the flange portion 32c of the differential cage 32. Then, the pinion gear 34 is supported on the rotatably supporting pin 35 as inserting the pin 35 into the bearing hole 32h from the outside of the differential cage 32, so that the pinion gear 34 is meshed with the one of the pair of side gears 33. The opposite one of the pair of side gears 33 (right side gear in this embodiment) is accommodated in the differential cage 32 in such a manner as to be meshed with the pinion gear 34.

In the above state, the ring gear 31 and the differential cage 32 are interlocked to each other via the fastening bolts 50, thereby assembling the differential gear device 30. The thus assembled differential gear device 30 is then supported on the second support portion 42 of the lid 40. The input shaft 20 is then supported on the first support portion 41 of the lid 40 in such a manner as to connect the input shaft 20 with the ring gear 31.

The lid 40 with the input shaft 20 and the differential gear device 30 supported thereon is then connected with the axle case 10. Lastly, the right and left front axles 120 are inserted into the inside of the pair of cylindrical portions 12 of the axle case 10 through the outer ends of the cylindrical portions 12 to respectively have inner ends fitted into the pair of side gears 33.

Accordingly, the axle assembly 1 of this embodiment can produce a desirable effect that the lid 40 with the differential gear device 30 and the input shaft 20 which have been separately assembled can be mounted on the axle case 10 without the necessity to assemble the differential gear device 30 within the axle case 10 having a limited space, or connect the differential gear device 30 with the input shaft 20 within such a limited space.

In other words, according to this embodiment, the differential gear device 30 can be previously and separately assembled and adjusted, and the lid 40 with the differential gear device 30 and the input shaft 20 supported thereon can be then mounted to the axle case 10, so that an efficiency to assemble the axle assembly 1 can be improved.

Figure 11:
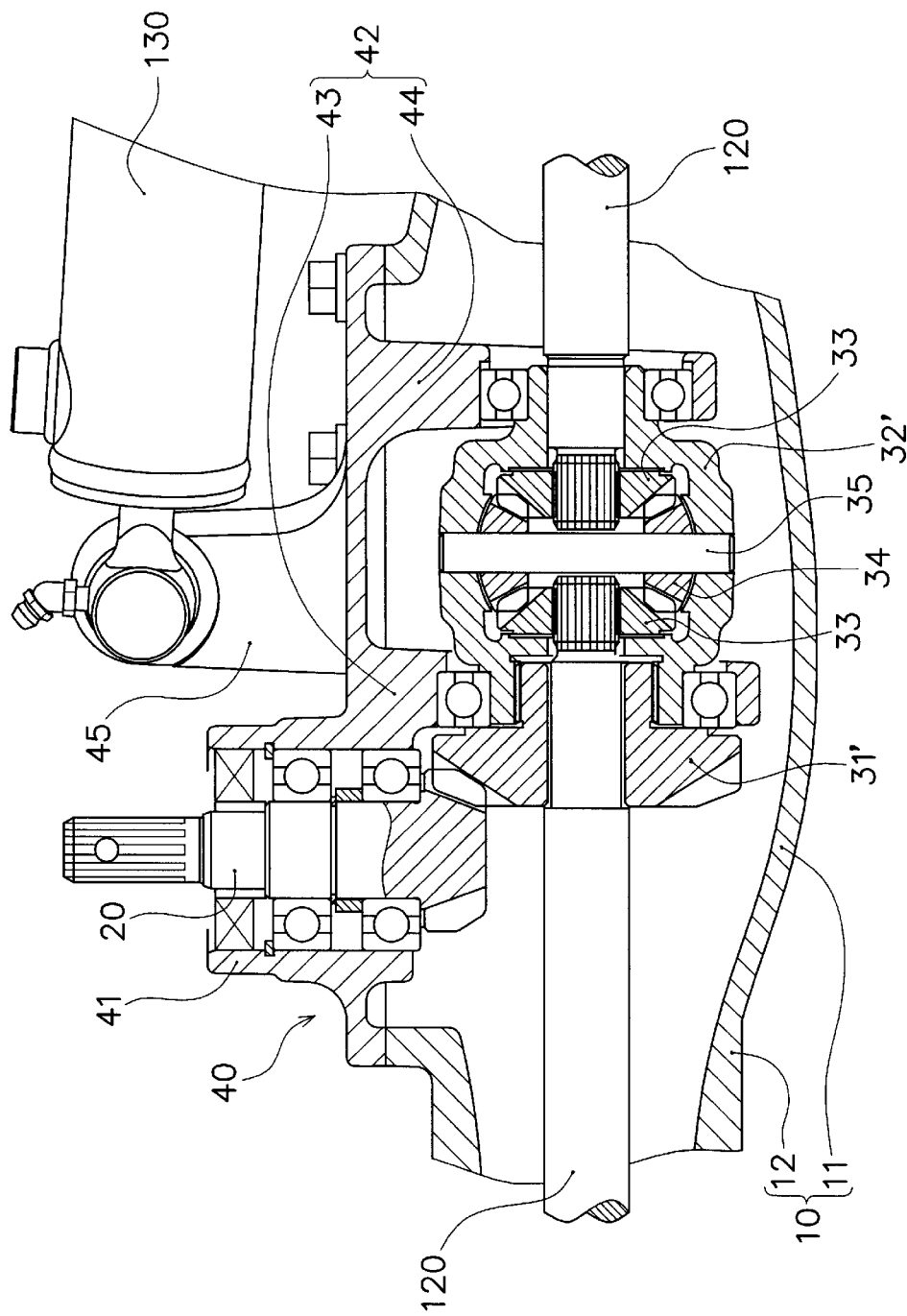
FIG. 11 is a cross-sectional plan view of the axle assembly according to another embodiment of the present invention.

The present invention is not necessarily limited to this embodiment. Rather, various modifications may be made to the axle assembly. For example, the ring gear 31 and the differential gear 32 can take various forms or arrangements, as far as they are relatively non-rotatably interlocked to each other. That is, as an alternative to the fastening bolts 50 of this embodiment which enable the ring gear 31 to be relatively non-rotatably connected with the differential cage 32, a spline coupling arrangement may be employed between ring gear 31' and differential cage 32', as illustrated in FIG. 11.

Although the axle assembly was described in this embodiment by taking for example the case where the axle assembly is applied for driving the front wheels which are steering and driving wheels, it is a matter of course that it can be applied for driving wheels which are not steering wheels.

This specification is by no means intended to restrict the present invention to the preferred embodiments set forth therein. Various modifications to the axle assembly, as described herein, may be made by those skilled in the art without departing from the spirit and scope of the present invention as defined in the appended claims.

What is claimed is:

1. An axle assembly comprising:
   an axle case for accommodating right and left driving axles, said axle case forming therein an opening;
   a differential gear device accommodated within said axle case through the opening of the axle case;
   a lid connected with the axle case so as to cover the opening;
   an input shaft for operatively receiving the driving force from an engine;
   wherein said differential gear device includes:
      a ring gear having a gear portion formed on a first side surface thereof, said first side surface facing the input shaft and being positioned along the axis of the driving axles, for being operatively connected with the input shaft, and forming an axle hole through which an inner end of one of the right and left driving axles relatively rotatably passes;
      a differential cage being relatively non-rotatably connected with the ring gear via a second side surface of the ring gear, said second side surface facing away from the input shaft and positioned along the axis of the driving axles, and forming therein an axle hole through which an inner end of the residual one of the right and left driving axles relatively rotatably passes, so that the inner ends of the right and left driving axles face to each other;
   said lid including a first support member for supporting said input shaft and a second support member for supporting said differential gear device; and
   wherein said first and second support members are displaced along the lengthwise direction of the right and left driving axles.

2. An axle assembly according to claim 1, wherein said second support member includes a first support wall for relatively rotatably supporting the ring gear, and a second support wall spaced apart from said first side wall along the lengthwise direction of the driving axles for relatively rotatably supporting the differential cage.

3. An axle assembly according to claim 2, wherein said second support member is positioned more inwardly than said first support member with respect to a vehicle width direction.

4. An axle assembly according to claim 3, wherein:
   said axle case has opposite outer ends respectively connected with a pair of steering wheels, which are interlocked with each other through a tie-rod for associated pivoting action;
   said cover case has an outer surface corresponding to said second support member and provided on said outer surface with an extension member that extends inwardly with respect to a vehicle lengthwise direction; and
   said extension member has a portion with which a fixing end of a power steering cylinder for pivoting one of the pair of steering wheels by pressure is rotatably connected.

5. An axle assembly according to claim 4, wherein said differential gear device further includes:
   a pair of side gears accommodated within the differential cage, while being respectively and relatively non-rotatably supported by said inner ends of the right and left driving axles; and
   a pinion gear accommodated within the differential cage in such a manner as to rotate in meshing engagement with said pair of side gears and move around a rotational axis of the differential cage in association with the rotation of the differential cage.

6. An axle assembly according to claim 5, wherein:
   said differential cage includes a flange portion abutting against the second side surface of the ring and forms therein an opening through which said pair of side gears can pass, a body portion extending from said flange portion in a direction away from the ring gear and providing an inner space for accommodating therein said pair of side gears and said pinion gear, and a bearing portion that extends from said body portion in a direction away from the ring gear and forms therein an axle hole through which an inner end of said residual one of the right and left driving axles relatively rotatably passes;
   said flange portion forms therein at least one hole for receiving at least one fastener for interlocking the differential cage with the ring gear; and
   said body portion forms therein at least one cut-away portion allowing for insertion of said at least one fastener into said at least one hole along the axis thereof.

7. An axle assembly according to claim 3, wherein said differential gear device further includes:
   a pair of side gears accommodated within the differential cage, while being respectively and relatively non-rotatably supported by said inner ends of the right and left driving axles; and
   a pinion gear accommodated within the differential cage in such a manner as to rotate in meshing engagement with said pair of side gears and move around a rotational axis of the differential cage in association with the rotation of the differential cage.

8. An axle assembly according to claim 7, wherein:
   said differential cage includes a flange portion abutting against the second side surface of the ring and forms therein an opening through which said pair of side gears can pass, a body portion extending from said flange portion in a direction away from the ring gear and providing an inner space for accommodating therein said pair of side gears and said pinion gear, and a bearing portion that extends from said body portion in a direction away from the ring gear and forms therein an axle hole through which an inner end of said residual one of the right and left driving axles relatively rotatably passes;

said flange portion forms therein at least one hole for receiving at least one fastener for interlocking the differential cage with the ring gear; and said body portion forms therein at least one cut-away portion allowing for insertion of said at least one fastener into said at least one hole along the axis thereof.

9. An axle assembly according to claim 2, wherein:

said axle case has opposite outer ends respectively connected with a pair of steering wheels, which are interlocked with each other through a tie-rod for associated pivoting action;

said cover case has an outer surface corresponding to said second support member and provided on said outer surface with an extension member that extends inwardly with respect to a vehicle lengthwise direction; and said extension member has a portion with which a fixing end of a power steering cylinder for pivoting one of the pair of steering wheels by pressure is rotatably connected.

10. An axle assembly according to claim 9, wherein said differential gear device further includes:

a pair of side gears accommodated within the differential cage, while being respectively and relatively non-rotatably supported by said inner ends of the right and left driving axles; and a pinion gear accommodated within the differential cage in such a manner as to rotate in meshing engagement with said pair of side gears and move around a rotational axis of the differential cage in association with the rotation of the differential cage.

11. An axle assembly according to claim 10, wherein:

said differential cage includes a flange portion abutting against the second side surface of the ring and forms therein an opening through which said pair of side gears can pass, a body portion extending from said flange portion in a direction away from the ring gear and providing an inner space for accommodating therein said pair of side gears and said pinion gear, and a bearing portion that extends from said body portion in a direction away from the ring gear and forms therein an axle hole through which an inner end of said residual one of the right and left driving axles relatively rotatably passes;

said flange portion forms therein at least one hole for receiving at least one fastener for interlocking the differential cage with the ring gear; and said body portion forms therein at least one cut-away portion allowing for insertion of said at least one fastener into said at least one hole along the axis thereof.

12. An axle assembly according to claim 2, wherein said differential gear device further includes:

a pair of side gears accommodated within the differential cage, while being respectively and relatively non-rotatably supported by said inner ends of the right and left driving axles; and a pinion gear accommodated within the differential cage in such a manner as to rotate in meshing engagement with said pair of side gears and move around a rotational axis of the differential cage in association with the rotation of the differential cage.

13. An axle assembly according to claim 12, wherein:

said differential cage includes a flange portion abutting against the second side surface of the ring and forms therein an opening through which said pair of side gears can pass, a body portion extending from said flange portion in a direction away from the ring gear and providing an inner space for accommodating therein said pair of side gears and said pinion gear, and a bearing portion that extends from said body portion in a direction away from the ring gear and forms therein an axle hole through which an inner end of said residual one of the right and left driving axles relatively rotatably passes;

said flange portion forms therein at least one hole for receiving at least one fastener for interlocking the differential cage with the ring gear; and said body portion forms therein at least one cut-away portion allowing for insertion of said at least one fastener into said at least one hole along the axis thereof.

14. An axle assembly according to claim 1, wherein:

said axle case has opposite outer ends respectively connected with a pair of steering wheels, which are interlocked with each other through a tie-rod for associated pivoting action;

said cover case has an outer surface corresponding to said second support member and provided on said outer surface with an extension member that extends inwardly with respect to a vehicle lengthwise direction; and said extension member has a portion with which a fixing end of a power steering cylinder for pivoting one of the pair of steering wheels by pressure is rotatably connected.

15. An axle assembly according to claim 14, wherein said differential gear device further includes:

a pair of side gears accommodated within the differential cage, while being respectively and relatively non-rotatably supported by said inner ends of the right and left driving axles; and a pinion gear accommodated within the differential cage in such a manner as to rotate in meshing engagement with said pair of side gears and move around a rotational axis of the differential cage in association with the rotation of the differential cage.

16. An axle assembly according to claim 15, wherein:

said differential cage includes a flange portion abutting against the second side surface of the ring and forms therein an opening through which said pair of side gears can pass, a body portion extending from said flange portion in a direction away from the ring gear and providing an inner space for accommodating therein said pair of side gears and said pinion gear, and a bearing portion that extends from said body portion in a direction away from the ring gear and forms therein an axle hole through which an inner end of said residual one of the right and left driving axles relatively rotatably passes;

said flange portion forms therein at least one hole for receiving at least one fastener for interlocking the differential cage with the ring gear; and said body portion forms therein at least one cut-away portion allowing for insertion of said at least one fastener into said at least one hole along the axis thereof.

17. An axle assembly according to claim 1, wherein said differential gear device further includes:

a pair of side gears accommodated within the differential cage, while being respectively and relatively non-rotatably supported by said inner ends of the right and left driving axles; and a pinion gear accommodated within the differential cage in such a manner as to rotate in meshing engagement with said pair of side gears and move around a rotational axis of the differential cage in association with the rotation of the differential cage.

18. An axle assembly according to claim 17, wherein:

said differential cage includes a flange portion abutting against the second side surface of the ring and forms therein an opening through which said pair of side gears can pass, a body portion extending from said flange portion in a direction away from the ring gear and providing an inner space for accommodating therein said pair of side gears and said pinion gear, and a bearing portion that extends from said body portion in a direction away from the ring gear and forms therein an axle hole through which an inner end of said residual one of the right and left driving axles relatively rotatably passes;

said flange portion forms therein at least one hole for receiving at least one fastener for interlocking the differential cage with the ring gear; and said body portion forms therein at least one cut-away portion allowing for insertion of said at least one fastener into said at least one hole along the axis thereof.

19. An axle assembly according to claim 17, wherein said ring gear has a protrusion axially protruding from the second side surface of the ring gear, and the differential cage forms on a side surface thereof facing the ring gear an engaging hole for receiving said protrusion, wherein the protrusion is engagingly inserted into the engaging hole so that the ring gear and the differential cage are interlocked with each other in such a manner as to be relatively non-rotatable around the axis.

20. An axle assembly according to claim 1, wherein said ring gear has a protrusion axially protruding from the second side surface of the ring gear, and the differential cage forms on a side surface thereof facing the ring gear an engaging hole for receiving said protrusion, wherein the protrusion is engagingly inserted into the engaging hole so that the ring gear and the differential cage are interlocked with each other in such a manner as to be relatively non-rotatable around the axis.

\* \* \* \* \*